US007482903B2

(12) United States Patent
Kaumann et al.

(10) Patent No.: US 7,482,903 B2
(45) Date of Patent: Jan. 27, 2009

(54) ELECTRICAL MACHINE WITH PART-WINDING CIRCUIT

(75) Inventors: Ulrich Kaumann, Salz (DE); Eduard Lyschick, Bad Neustadt (DE)

(73) Assignee: Siemens Aktiengesellschaft, München (DE)

( * ) Notice: Subject to any disclaimer, the term of this patent is extended or adjusted under 35 U.S.C. 154(b) by 58 days.

(21) Appl. No.: 11/752,668

(22) Filed: May 23, 2007

(65) Prior Publication Data

US 2007/0273236 A1 Nov. 29, 2007

(30) Foreign Application Priority Data

May 23, 2006 (DE) .................. 10 2006 024 241

(51) Int. Cl.
H01F 27/02 (2006.01)
(52) U.S. Cl. ..................................... 336/147
(58) Field of Classification Search ................. 336/107, 336/180–184, 220–223, 145, 147, 5, 10, 336/15, 148; 310/179–184; 318/771–777
See application file for complete search history.

(56) References Cited

U.S. PATENT DOCUMENTS 1,495,420 A * 5/1924 Lewis .......................... 318/771
1,992,050 A * 2/1935 Alger .......................... 318/778
3,035,222 A 5/1962 Stone
3,325,681 A 6/1967 Parsons
5,068,587 A 11/1991 Nakamura et al.
5,134,332 A 7/1992 Nakamura et al.
5,177,423 A 1/1993 Nakamura et al.
5,821,660 A * 10/1998 Anderson ................... 310/184

FOREIGN PATENT DOCUMENTS

| DE | 846 877 C | 8/1952 |
| DE | 10 21 945 | 1/1958 |
| DE | 11 21 204 B | 1/1962 |
| EP | 0 238 940 A1 | 9/1987 |

* cited by examiner

Primary Examiner—Tuyen T. Nguyen
(74) Attorney, Agent, or Firm—Henry M. Feiereisen; Ursula B. Day

(57) ABSTRACT

An electrical machine includes a first part-winding, a second part-winding, a core having slots in which the first and the second part-windings are wound, and a switching device for connecting the first part-winding to the second part-winding. In each of the slots, one of the two part-windings forms a bottom layer at the slot base, and the other part-winding is disposed as a top layer parallel above the bottom layer. The two part-windings are capable of being connected in parallel with the switching device during operation of the electrical machine. It is thus possible for a symmetrical field distribution to be achieved in a startup circuit. In addition, no additional components caused by harmonic fields occur in the torque curve which could impede runup.

7 Claims, 4 Drawing Sheets

ELECTRICAL MACHINE WITH PART-WINDING CIRCUIT

CROSS-REFERENCES TO RELATED APPLICATIONS

This application claims the priority of German Patent Application, Serial No. 10 2006 024 241.6, filed May 23, 2006, pursuant to 35 U.S.C. 119(a)-(d), the content of which is incorporated herein by reference in its entirety as if fully set forth herein.

BACKGROUND OF THE INVENTION

The present invention relates, in general, to the field of electrical machines

Nothing in the following discussion of the state of the art is to be construed as an admission of prior art.

An electric machine of a type involved here includes a first part-winding, a second part-winding, a core having slots in which the first and the second part-windings are wound, and a switching device for connecting the first part-winding to the second part-winding. In the following description, the term "part-winding" relates to a winding unit which, optionally including a plurality of turns, can be connected to a winding head of the electric machine.

While star/delta startup is conventional in Europe as a starting measure for asynchronous motors for reducing the startup current, in America so-called part-winding circuits or part-winding startups are widespread. This type of startup has also been accepted as standard worldwide in refrigerator technology. With such part-winding circuits, only some of the slots have current flowing through them in the startup phase. The resultant increase in resistance and leakage in comparison with the operating circuit in which in general all of the slots have current flowing through them results in a reduction in the startup current, which naturally brings with it a corresponding reduction in the torque. The advantage of these circuits in comparison with star/delta startup consists in the fact that the motor is not isolated from the power supply system when changed over to the operating circuit, but the second part-winding is connected to the motor which is already "excited" by the first part-winding.

The disadvantage of a part-winding circuit is the asymmetrical field distribution in the startup phase, in which only the first part-winding is connected, since only some of the slots are magnetized. The resultant additional harmonic fields result in corresponding harmonic field moments, which, under certain circumstances, prevent complete runup of the motor. In this case, the motor remains "stuck" at a saddle speed during runup. This is particularly the case for the most widespread type of part-winding, in which the motor winding is split into two entirely identical part-windings.

Published European Pat. Appl. No. EP 0 238 940 B1 discloses a startup circuit which attempts to address the disadvantage of the asymmetrical field distribution in the startup phase. This circuit has, however, first and second part-windings which are markedly different, and, during operation, currents of different levels flow into the feed lines to the respective part-winding. Accordingly, different switching devices are required for the two part-windings. This entails increased costs for the motor driving.

The object of the present invention consists in ensuring complete runup of an electrical machine with a startup circuit while keeping the costs as low as possible.

It would therefore be desirable and advantageous to provide an improved electric machine to obviate prior art shortcomings and to ensure complete runup with a startup circuit while keeping the costs as low as possible.

SUMMARY OF THE INVENTION

According to one aspect of the present invention, an electrical machine includes a first part-winding, a second part-winding, a core having slots in which the first and the second part-windings are wound, and a switching device for connecting the first part-winding to the second part-winding, wherein in each of the slots one of the first and second part-windings is disposed at a slot base to form a bottom layer, and the other one of the first and second part-winding is disposed parallel above the bottom layer to form a top layer, and wherein the first and the second part-windings are capable of being connected in parallel to the switching device during operation of the electrical machine.

According to another feature of the present invention, the two part-windings may also be configured so as to be connectable in series with the switching device. The electrical machine, if the part-windings are connected in series, can therefore be used for a higher operating voltage. For a lower operating voltage, the part-windings can be connected in parallel so as to ensure the corresponding startup response.

The two part-windings can be designed to be completely identical. This results, during operation, in a 50:50 split of the current, with the result that two identical contactors for both part-windings can be used for the startup.

Furthermore, there is no need for intermediate part-winding insulation between the two part-windings in one slot owing to the fact that the two part-windings are associated with the same winding phase. This makes it possible to overall further reduce the manufacturing costs of the electrical machine.

The electrical machine according to the invention may be in the form of a three-phase asynchronous motor. In this case, in each case a first and a second part-winding are associated with each of the three phases, and the windings of the three phases are star-connected to one another.

It is advantageous if all the slots of the core each have a part-winding as a bottom layer and a part-winding as a top layer. In this way, a symmetrical field distribution can be achieved in the startup circuit, with the result that no additional components brought about by harmonic fields occur in the torque curve which could impede runup.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
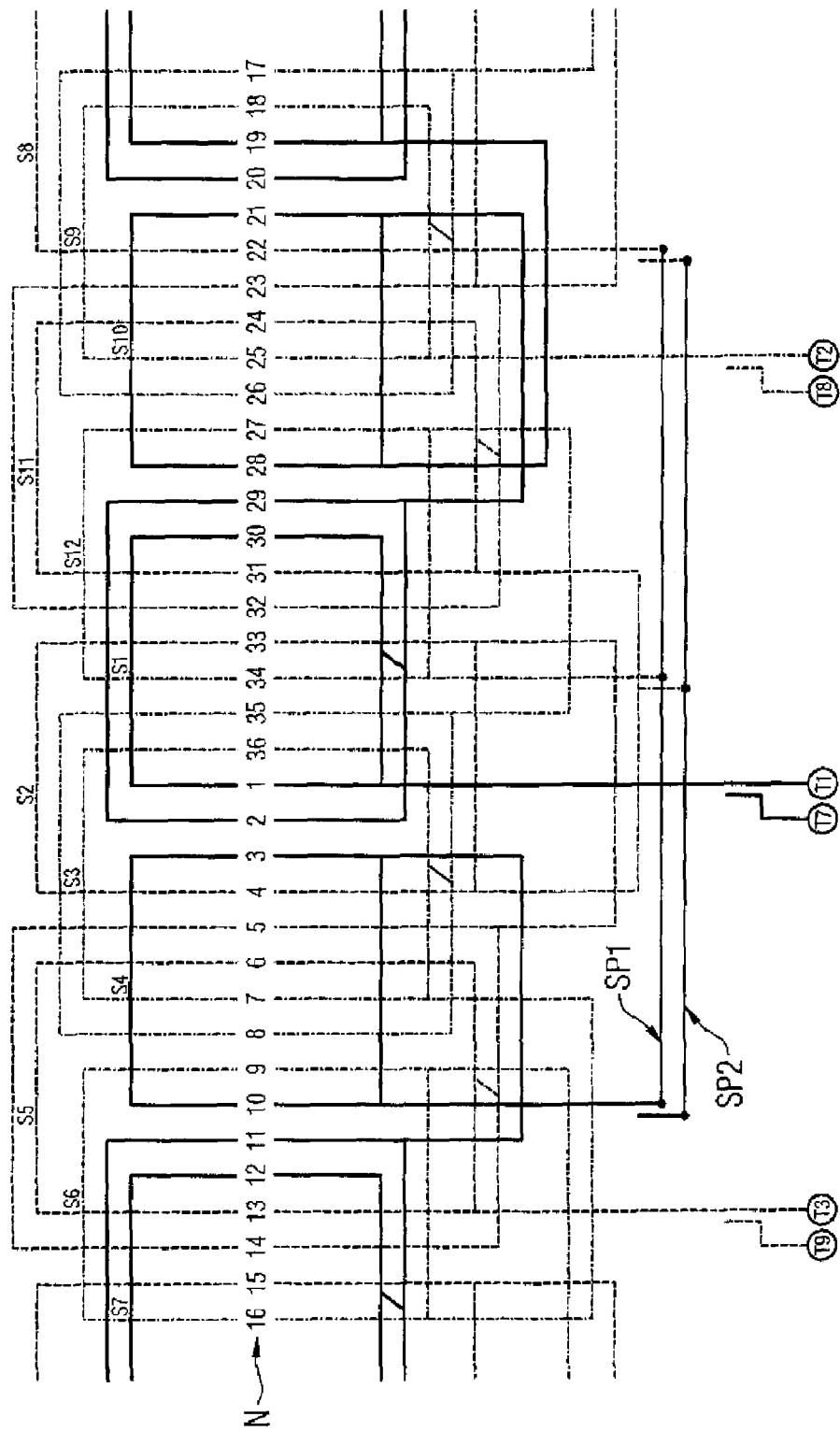
FIG. 1 shows a four-pole winding according to the invention with six winding ends.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a four-pole winding which includes 12 coils S1 to S12, which are inserted or wound into 36 slots N. The coils S1, S4, S7 and S10 belong to a first phase and are illustrated by continuous lines in FIG. 1. The coils S3, S6, S9 and S12 belong to a second phase and are illustrated by dash-dotted lines. Finally, the coils S2, S5, S8 and S11 belong to a third phase and are illustrated by dashed lines in FIG. 1. The coils of each phase are in each case interconnected to form a first part-winding. The first part-windings of all three phases flow into a star point SP1. The respective free end of the first part-windings is denoted by T1, T2 and T3. A respective second part-winding runs in parallel with each of the first part-windings. The second part-windings flow into a common star point SP2, and their free ends are denoted by T7, T8 and T9.

The first part-windings with the ends T1, T2 and T3 are in each case arranged at the slot base of the respective slots as a bottom layer. The second part-windings with the winding ends T7, T8 and T9 are arranged in the slots respectively as a top layer, i.e. facing the stator bore. Two identical part-windings therefore result which can be used for a part-winding circuit.

In the startup circuit, i.e. in the circuit of the windings in the startup phase, all the slots have current flowing through them since the first part-windings, which are at the slot base, have current flowing through them. As a result, a symmetrical field distribution is set. The reduction in current and torque during startup arises owing to the increase in resistance, since a first part-winding has only half the cross section of the entire winding, and the slightly higher slot leakage of the winding part at the slot base. The different leakage effect results, in the first part-winding at the slot base, in a slightly greater reduction in current and torque than in the second part-winding at the stator bore.

In the first part-winding, approximately the same reductions in current and torque are achieved as in the type of winding according to European Pat. Appl. No. EP 0 238 940 B1. In comparison with the conventional 50:50 part-winding, slightly higher startup currents result in the part-winding, but for this also a considerably higher startup torque and acceleration torque. In the operating circuit, i.e. with the second part-winding connected, the influence of the different slot leakage in the two part-windings is only small; virtually identical currents result in the feed lines to the part-windings.

Advantageously, the part-winding circuit according to the invention results, during operation, in the uniform current splitting which is conventional with the customary 50:50 part-winding. The saddle torques in the part-winding circuit which endanger runup are avoided, however. The starting response corresponds to that of the circuit according to EP 0 238 940 B1, but in this case uniform current splitting occurs during operation.

The winding according to the invention can be produced in a similarly cost-effective manner to the so-called repeat winding, as is also the case with the winding according to EP 0 238 940 B1. In particular, no intermediate insulation is required in the slots, since all the conductors in one slot belong to the same winding phase. However, the winding according to the invention requires less switching complexity than the winding according to EP 0 238 940 B1.

The mentioned advantages can also be used for other windings. In particular, one is not restricted to machines with 36 slots and four poles. Further exemplary embodiments are therefore represented in the text which follows.

Figure 2:
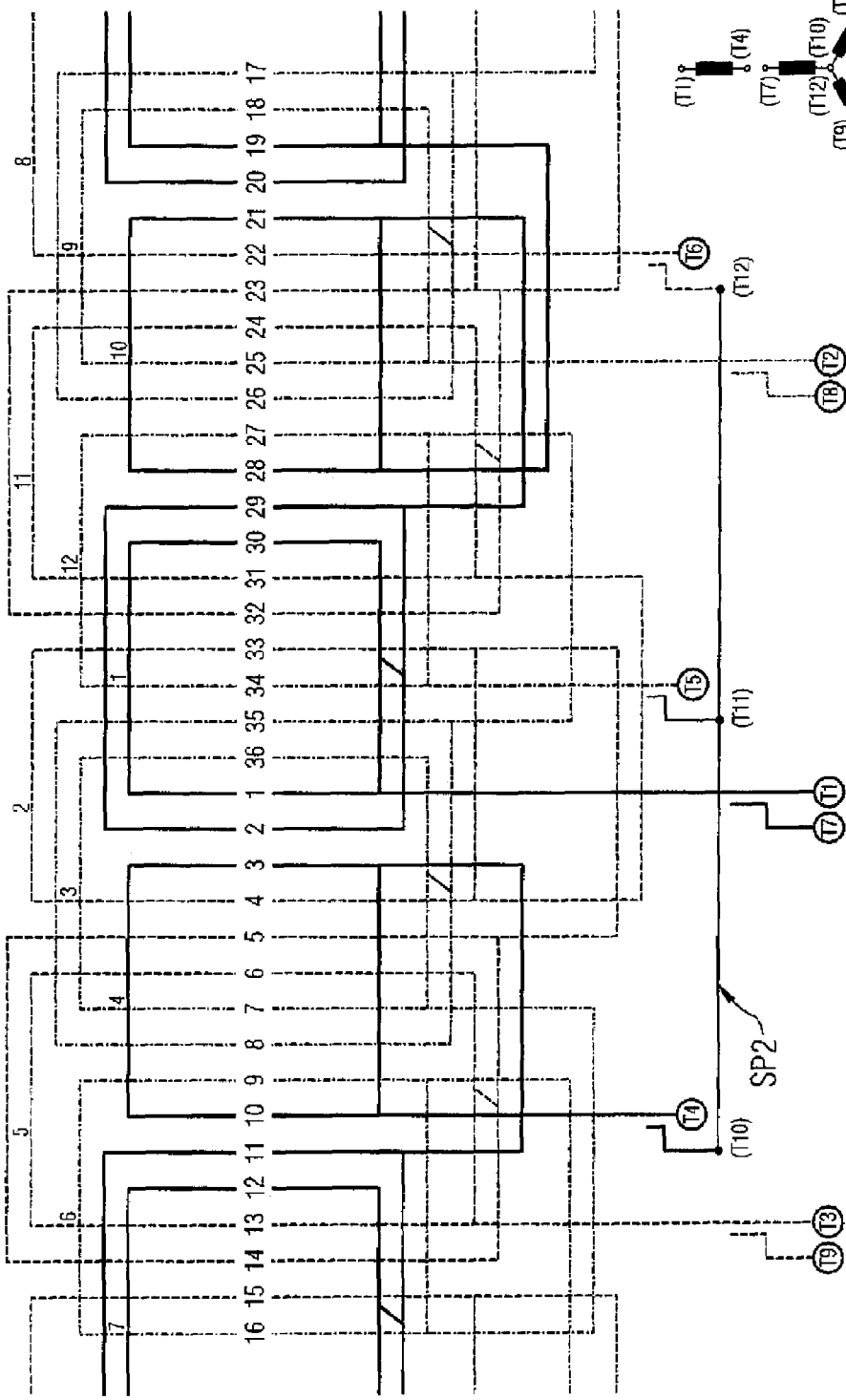
FIG. 2 shows a four-pole winding according to the invention with nine winding ends.
Figure 3:
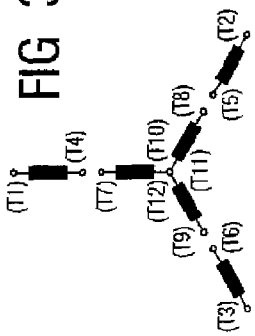
FIG. 3 shows a star circuit appropriate for the winding in FIG. 2.

The winding reproduced in FIG. 2 substantially corresponds to that in FIG. 1. The first part-windings with the winding ends T1, T2 and T3 are in this case not interconnected at their other ends at a common star point, however. Instead, the other ends, in this case the winding ends T4, T5 and T6, are likewise free and can be interconnected by a switching device. The parallel part-windings with the free ends T7, T8 and T9, on the other hand, are interconnected at the common star point SP2, as before. This star point then corresponds to the fictitious winding ends T10, T11 and T12. The corresponding circuit diagram is reproduced in FIG. 3. The winding accordingly has nine winding ends T1, T4, T7 and T2, T5, T8 as well as T3, T6, T9. The winding can therefore be used for a motor which can be operated, for example, with a double-star circuit, on an operating voltage of 230 V and, with a star circuit, on an operating voltage of 460 V. In addition, at 230 V the part-winding startup is also possible. The winding from FIG. 2 is therefore not only suitable for variable-voltage motors, but also for part-winding startups.

Figure 4:
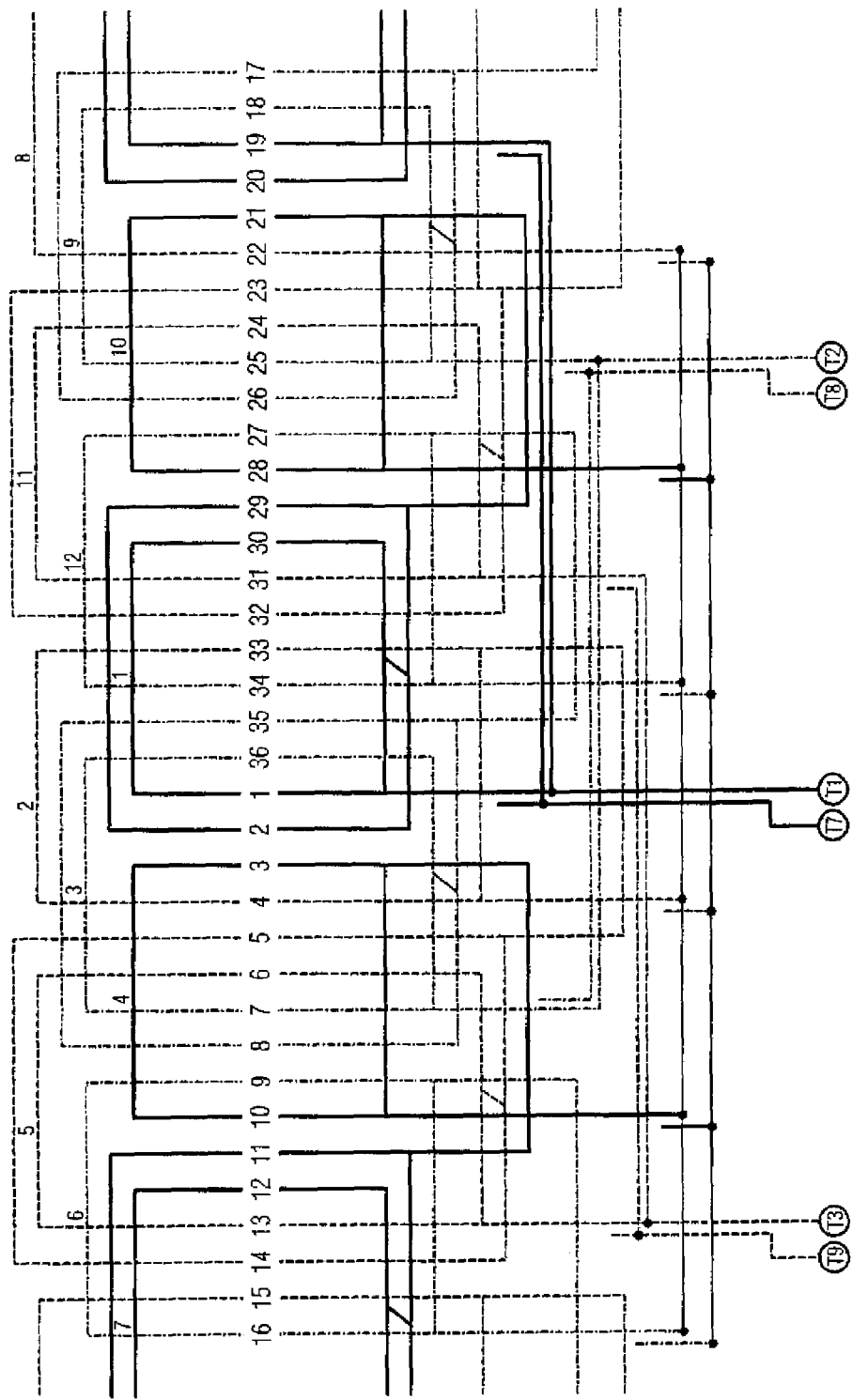
FIG. 4 shows a winding, which corresponds to the winding in FIG. 1, with two parallel winding branches.

The winding reproduced in FIG. 4 corresponds to that in FIG. 1, but the winding is designed to have two parallel winding branches. As a result, in particular in the case of small values for the number of conductors per slot (turns number), more precise winding matching is possible.

Figure 5:
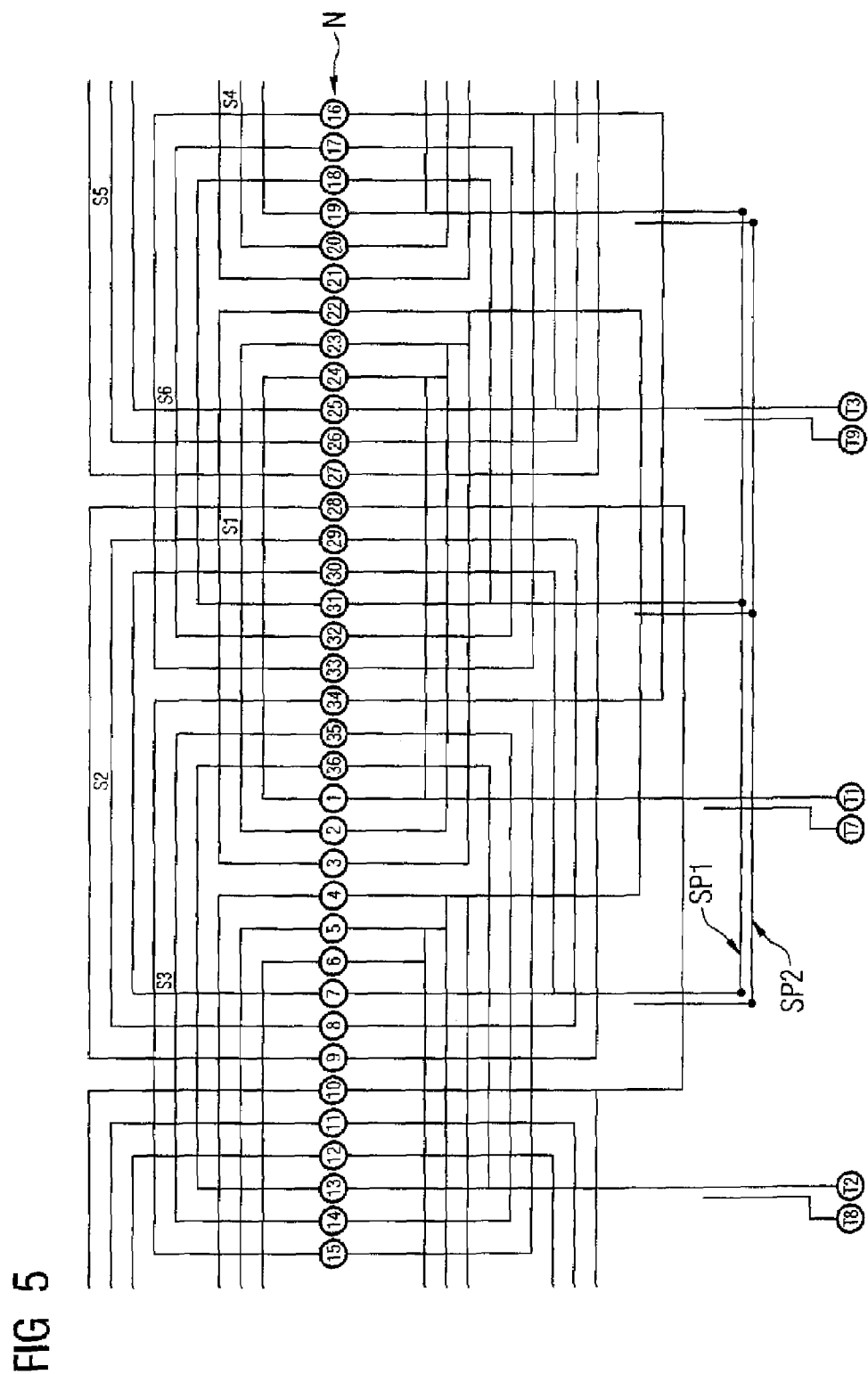
FIG. 5 shows a two-pole winding according to the invention with six winding ends.

A further exemplary embodiment of the winding of an electrical machine according to the invention is represented in FIG. 5. This is a two-pole three-phase winding. Accordingly, the six coils S1 to S6 are accommodated in the 36 slots N. Each of the windings or coils is designed to have two parallel wires. Accordingly, this again results in six part-windings, the first part-windings meeting with the free ends T1, T2 and T3 at the common star point SP1, and the second part-windings meeting with the free winding ends T7, T8 and T9 at the second star point SP2.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein.

What is claimed is:

1. An electrical machine, comprising:
a first part-winding;

a second part-winding;

a core having slots in which the first and the second part-windings are wound; and a switching device for connecting the first part-winding to the second part-winding, wherein in each of the slots one of the first and second part-windings is disposed at a slot base to form a bottom layer, and the other one of the first and second part-winding is disposed parallel above the bottom layer to form a top layer, and wherein the first and the second part-windings are capable of being connected in parallel to the switching device during operation of the electrical machine.

2. The electrical machine of claim 1, wherein the first and second part-windings are capable of being connected in series with the switching device.

3. The electrical machine of claim 1, wherein the first and second part-windings are identical.

4. The electrical machine of claim 1, wherein the first and second part-windings are configured in the slot in the absence of an intermediate part-winding insulation therebetween.

5. The electrical machine of claim 1, constructed in the form of a three-phase asynchronous motor.

6. The electrical machine of claim 5, wherein each of the three phases has associated thereto first and second part-windings, with windings of the three phases being star-connected to one another.

7. The electrical machine of claim 1, wherein all slots of the core have each a part-winding as a bottom layer and a part-winding as a top layer.

* * * * *